Oct. 24, 1961  G. T. BLACKWELL, JR  3,005,479
ADZING APPARATUS CUTTER FOR RAILROAD CROSSTIES
Filed Aug. 1, 1960
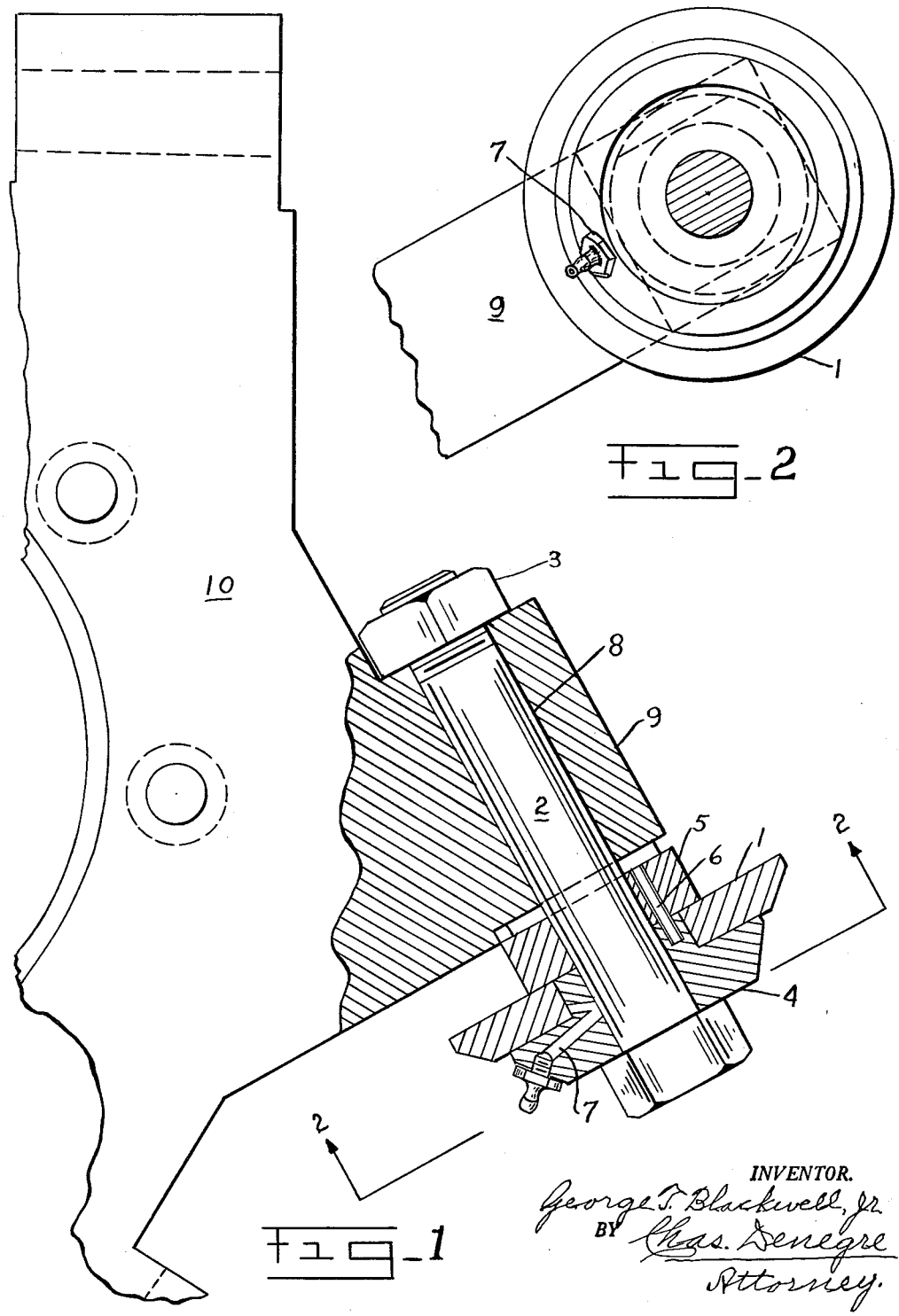
INVENTOR.
George T. Blackwell, Jr.
BY Chas. Denegre
Attorney.

United States Patent Office 3,005,479
Patented Oct. 24, 1961

3,005,479
ADZING APPARATUS CUTTER FOR
RAILROAD CROSSTIES
George T. Blackwell, Jr., 812 2nd Ave. E., Oneonta, Ala.
Filed Aug. 1, 1960, Ser. No. 46,673
2 Claims. (Cl. 144—134)

This invention relates to an adzing apparatus cutter for railroad crossties. It has for its main objects to provide such an apparatus cutter that will be highly satisfactory for the purpose intended, simple in structure, comparatively cheap to manufacture, easy to keep in working condition, and extremely durable.

A further object is to provide such an apparatus with revolvable cutting means, the dominating feature of the present invention, instead of fixed in position cutters for use as now generally provided.

Other objects and advantages will appear from the drawing and description.

By referring generally to the drawing it will be observed that—

FIG. 1 is a plan view, part full and part in section, showing part of an adzing cutter head with a disc cutter attached thereon according to the present invention.

FIG. 2 is a view on line 2—2 of FIG. 1 showing the revolvable cutter and part of the cutter head.

Referring to the drawing in detail it will be seen that the disc cutter 1 is mounted revolvably around a bolt 2 having an adjusting nut 3 for holding the part 4 against the cutter outer portion with the inner part of the cutter adjacent the part 5 that is held in fixed position by round pin 6 with its outer end in part 4. The cutter is provided with lubricating oil through channel 7 in the part 4. The cutter is mounted revolvably on the inner portion of part 4. The bolt is attached through hole 8 in the outer edge portion 9 of a cutter head outer portion 10. Such heads generally provide for a plurality of disc cutters mounted equal distances around their outer circumference faces on integral extensions similar to the shape shown in FIG. 1.

From the foregoing it will appear that a revolvable type disc cutter made according to this invention is suitable for use on adzing apparatus for railroad crossties now in use that have the cutters held in fixed positions by bolt means making it necessary to reset by manual means the cutters when the portions of their edges become dull by use.

The revolvable cutters made according to this invention may be made of any material suitable for the purpose, but I prefer to use high grade metal. Also the cutters may be made in different sizes and capacities depending on how and where to be used.

While I have shown and described the preferred embodiment of my invention, I do not wish to limit the same to the exact and precise details of structure, and I reserve the right to make all modifications and changes so long as they remain within the scope of the invention and the following claims.

Having described my invention I claim:

1. An adzing apparatus for railroad crossties having revolvable cutters comprising, a head for holding cutters, each cutter being disc-shaped with a beveled edge, two holding parts, the cutter being held between said parts and being mounted revolvable on a portion of one part, a bolt, said bolt having an integral head and tightening nut, part of said holding head having a hole of a size for said bolt to be inserted therethrough, each of said two holding parts having a hole therein, said holes being of a size for said bolt to be inserted therethrough, the inner part having shoulder means to prevent it from revolving, a round pin, said pin being held at one end portion in a hole in the inner part, the outer part having a hole therein, the other end of the pin being in this hole; an oil channel with a sealing cap thereon, said channel extending through said outer part and leading to the inner face of the cutter; said bolt being inserted through the hole in the cutter and holes in the parts adjacent the cutter and the hole in the holding head portion for holding the same together for use.

2. A cutter and a holding head for adzing railroad crossties comprising, a disc-shaped metal structure having a beveled edge, two holding parts, the cutter being held between said parts and being mounted revolvable on a portion of one part, a bolt, said bolt having an integral head and tightening nut, part of said holding head having a hole of a size for said bolt to be inserted therethrough, each of said two holding parts having a hole therein, said holes being of a size for said bolt to be inserted therethrough, the inner part having shoulder means to prevent it from revolving, a round pin, said pin being held at one end portion in a hole in the inner part, the outer part having a hole therein, the other end of the pin being in this hole; an oil channel with a sealing cap thereon, said channel extending through said outer part and leading to the inner face of the cutter; said bolt being inserted through the hole in the cutter and holes in the parts adjacent the cutter and the hole in the holding head portion for holding the same together for use.

References Cited in the file of this patent
UNITED STATES PATENTS

| | | |
|---|---|---|
| 334,594 | Maloy | Jan. 19, 1886 |
| 473,850 | McDonald | Apr. 26, 1892 |
| 633,153 | Philbrick | Sept. 19, 1899 |
| 681,458 | Philbrick | Aug. 27, 1901 |
| 901,681 | Collet | Oct. 20, 1908 |
| 1,294,106 | Humason | Feb. 11, 1919 |